Aug. 25, 1959 H. BECKER 2,900,859
LATHES
Filed Feb. 5, 1953 5 Sheets-Sheet 1
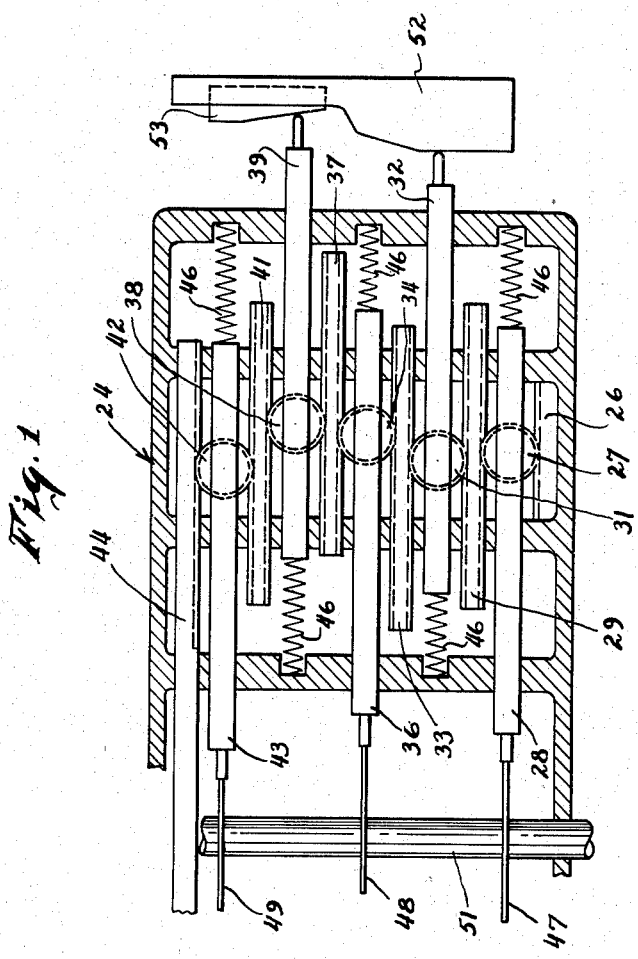
INVENTOR.
HANS BECKER
BY
Mestern & Kollin
ATTORNEYS Aug. 25, 1959
H. BECKER
2,900,859
LATHES
Filed Feb. 5, 1953
5 Sheets-Sheet 2
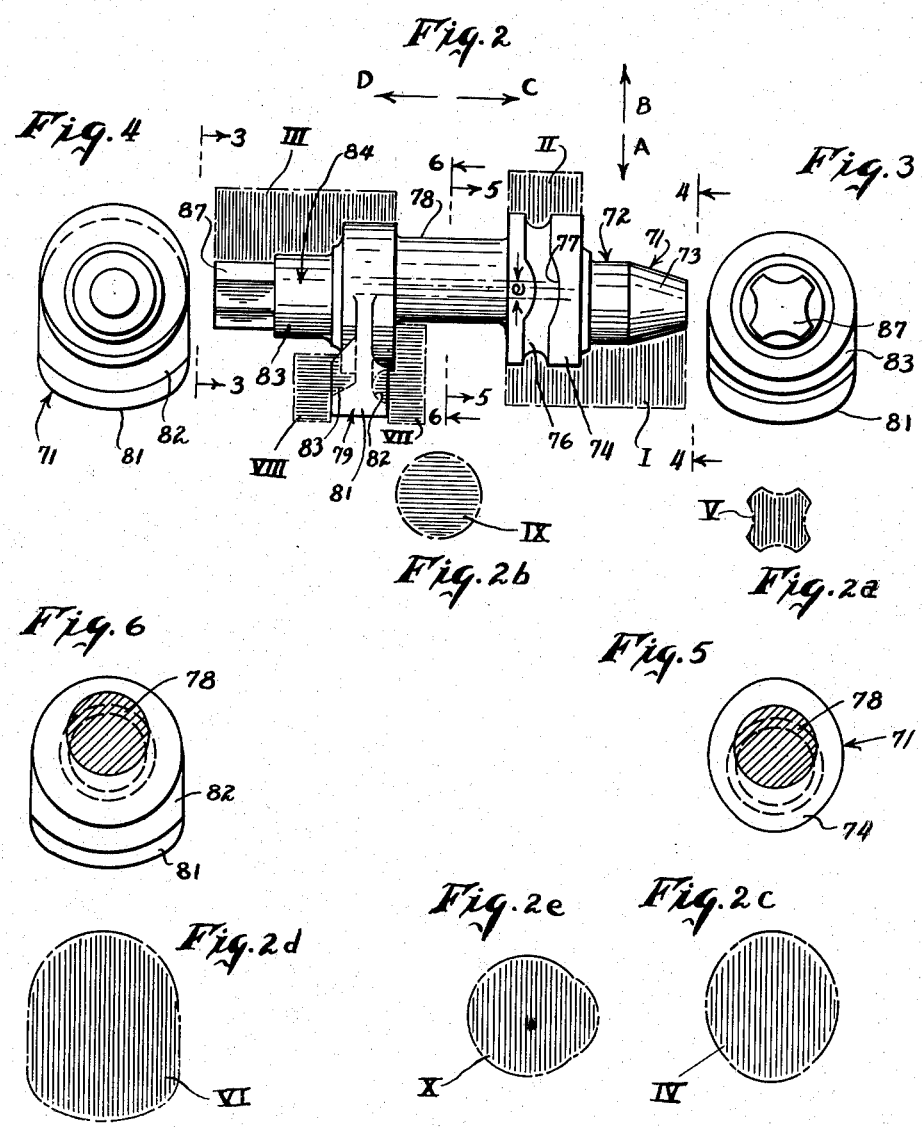
INVENTOR.
HANS BECKER
BY
Mestern & Rollin
ATTORNEYS

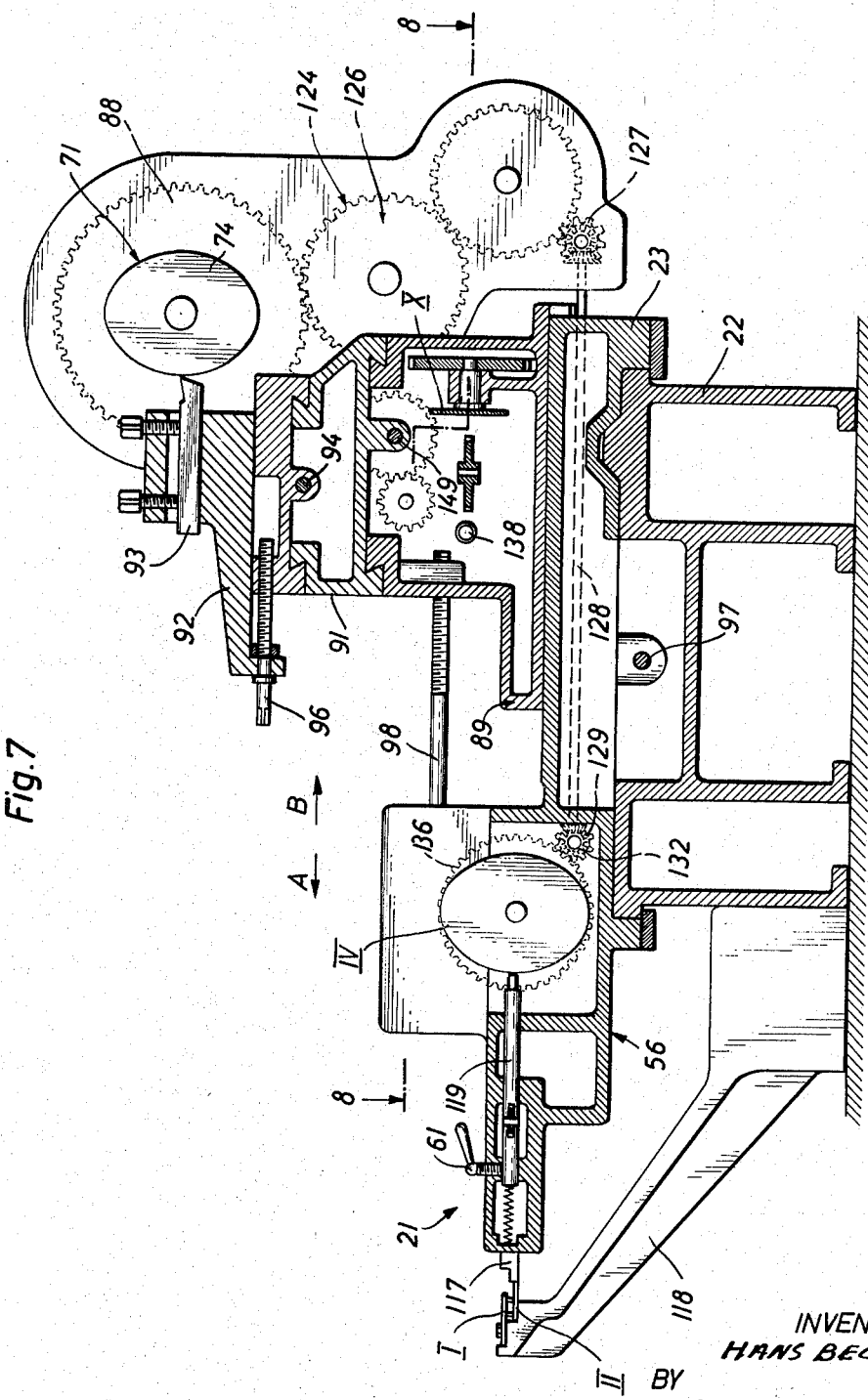

Aug. 25, 1959
H. BECKER
2,900,859
LATHES
Filed Feb. 5, 1953
5 Sheets-Sheet 4
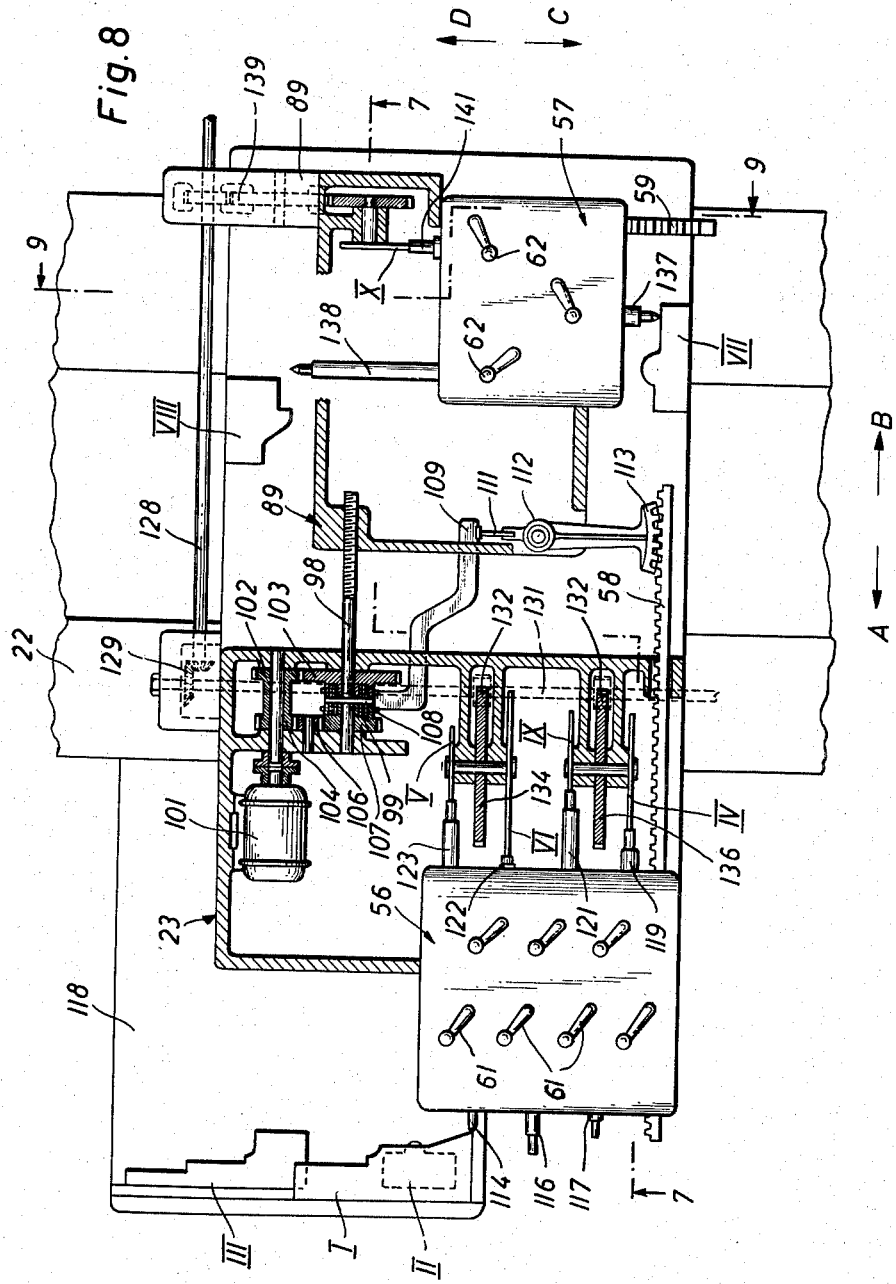
INVENTOR
HANS BECKER
BY
Mestern & Kollin
ATTORNEYS

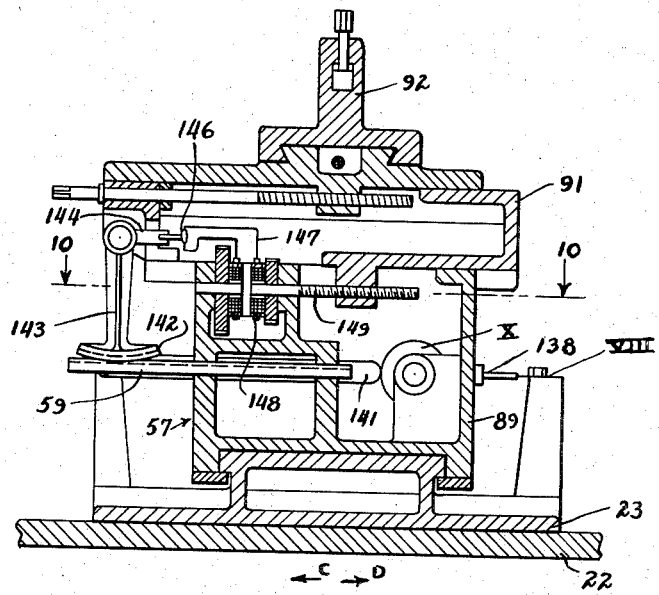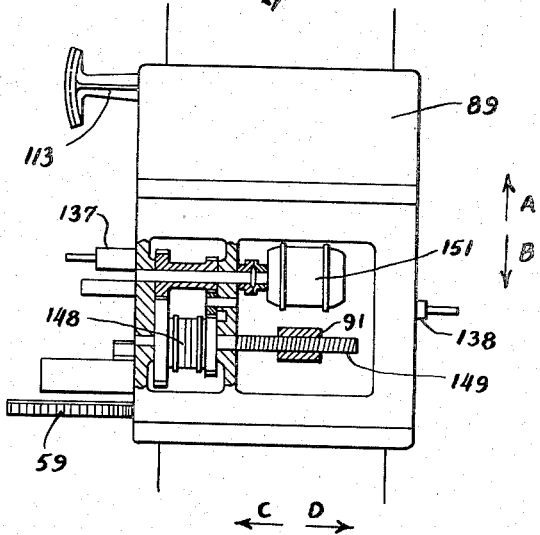

United States Patent Office 2,900,859
Patented Aug. 25, 1959

2,900,859
LATHES
Hans Becker, Dusseldorf-Heerdt, Germany
Application February 5, 1953, Serial No. 335,317
Claims priority, application Germany February 7, 1952
2 Claims. (Cl. 82—19)

The invention relates to lathes, and relates more particularly to lathes for use in copying of a work piece and to a device for copying a work piece for use in connection with a lathe.

The art of copying work pieces, particularly those having irregular shape, has heretofore followed the principle of taking a master, applying contact fingers to said master, and transmitting impulses from these contact fingers to a suitable lathe for turning therein a copy of the master.

Copying with the above described method has the disadvantage that a high degree of skill is required to operate the lathe with only a minimum of mechanized transmission from the master to the lathe possible. Should it be desired that the copy deviates in any respect from the master, it has heretofore been necessary first to make a new master in which there are incorporated the desired deviations, and thereafter to copy the new master.

It is among the principal objects of the invention to provide for copying which can be carried out with a maximum of mechanization, and to render it possible to make from one master not only exact copies but also copies that deviate to a predetermined extent from the master.

The invention accordingly comprises the features of construction, combination of elements and arrangement of parts which will be exemplified in a construction hereinafter set forth and the scope of the application of which will be indicated in the claims.

The foregoing and other objects of the invention will be best understood from the following description of exemplifications thereof, reference being had to the accompanying drawings, in which:

Fig. 1 is a fragmentary schematic sectional view showing a cam and cam follower arrangement in accordance with the invention;

Fig. 2 is an elevational view showing a work piece of the type that may be copy-machined on a lathe in accordance with the invention, and showing also schematically the shapes of some of the cams used for copying;

Figs. 2a–2e are schematical views illustrating the remaining shapes of cams used in machining the work piece shown in Fig. 2;

Fig. 3 is an end elevational view, seen in direction 3—3 of Fig. 2;

Fig. 4 is an end elevational view, seen in direction 4—4 of Fig. 2;

Fig. 5 is a sectional view taken on line, and in direction of the arrows, 5—5 of Fig. 2;

Fig. 6 is a sectional view taken on line, and in direction of the arrows, 6—6 of Fig. 2;

Fig. 7 is a vertical elevational view of a lathe in accordance with the invention, designed to machine the work piece shown in Fig. 2, and taken on line 7—7 of Fig. 8;

Fig. 8 is a fragmentary horizontal sectional view, taken on line 8—8 of Fig. 7;

Fig. 9 is a fragmentary vertical sectional view taken on line 9—9 of Fig. 8; and Fig. 10 is a horizontal fragmentary sectional view taken on line 10—10 of Fig. 9.

In carrying the invention into effect in one of the embodiments which has been selected for illustration in the accompanying drawings and for the description in this specification, and referring now particularly to Figs. 7–10, there is provided a lathe generally indicated at 21. The lathe 21 is provided with a bed 22 on which there is reciprocably carried a first carriage 23 that is movable in opposite horizontal directions C and D (Fig. 8) lengthwise on the bed 22 and axially of the work piece (Fig. 7).

*Cam and cam follower device*

In order to explain the very principle of the copying device, as used in accordance with the invention, there has schematically been illustrated in Fig. 1 a cam and cam follower device which form part of the invention.

As illustrated in Fig. 1, there is provided a housing 24 that forms part of a carrier of the lathe. A first rack carrier 26 is secured stationary on the interior of the housing 24, and a first pinion 27 is in mesh with the rack of the first carrier 26. The pinion 27 is centrally journalled on a first cam follower 28 and is in mesh, oppositely of the rack of said first carrier 26 with one rack of a second movable rack carrier 29. Said second carrier 29 has two racks oppositely arranged. The opposite rack of said second carrier 29 is in mesh with a second pinion 31 that is journalled on a second cam follower 32 and is in mesh with one rack of a third movable rack carrier 33. The third rack carrier 33 also has two racks. The other rack of said third carrier 33 is in mesh with a third pinion 34 that is journalled on a third cam follower 36 and meshes also with one rack of a fourth movable rack carrier 37. The fourth rack carrier 37 is also provided with two racks. The other rack of said fourth rack carrier 37 is in mesh with a fourth pinion 38 that is journalled on a fourth cam follower 39 and meshes also with one rack of a movable fifth rack carrier 41. The carrier 41 is also provided with two racks. The other rack of said fourth carrier 38 is in mesh with a fifth pinion 42 that is journalled on a fifth cam follower 43 and is in mesh with the rack of a movable terminal rack carrier 44. Said terminal carrier 44 extends to the exterior of the housing 24.

A spring 46 is provided for each of the cam followers 28, 32, 36, 39, and 43, urging each cam follower outwardly of the housing 24.

Each of the cam followers is in contact with a cam. For instance, three rotary cams designated 47, 48, and 49 may be secured on a rotatable shaft 51 common to all three and which is journalled in the housing 24, and the first cam follower 28 in contact with the cam 47, the third cam follower 36 in contact with the cam 48, and the fifth cam follower 43 in contact with the cam 49.

The rotary cams, of the type designated 47, 48, and 49 in Fig. 1 may be used for profiling the work piece on the lathe radially of the axis of rotation of said said work piece. For the profiling axially of the rotating work piece there may be provided stationary cams, such as the cams 52 and 53 of Fig. 1 that cooperate with the cam followers 32 and 39, respectively. In accordance with this divided arrangement, the cam followers 28, 36, and 43 that make contact with the rotary cams 47, 48, and 49 protrude on one side of the housing 24, whereas the cam followers 32 and 39 that make contact with the stationary cams 52 and 53 extend at the opposite side of the housing 24.

Whereas the movement from the rotary cams, as imparted from the shaft 51 brings about the shifting, against the force of the springs 46, of the cam followers 28, 36, and 43, the shifting of the cam followers 32 and 39, on the other hand, is brought about by a sliding of these followers against the stationary cams 52 and 53, respectively. The cam followers 32 and 39 slide when the housing 24 is moved (upward or downward in respect of Fig. 1).

The operation of the aforedescribed device shown in Fig. 1 is as follows:

Assuming that the first cam follower 28 is being pressed inwardly (to the right in Fig. 1) by the cam 47, while the remaining cam followers are immobilized as explained later on, the first pinion 27 will be moved in the same direction. During this movement, the first pinion 27 will roll against the rack of the first carrier 26, and will move the second carrier 29 in the same direction (to the right, Fig. 1), but for a distance twice the size of that of the first cam follower 28. The second pinion 31, cam follower 32, will transmit the entire shifting movement of the second rack carrier 29 to the third carrier 33, but in an opposite direction (to the left, Fig. 1). The pinions 34, 38 and 42 will shift for the full amount the carriers 37 and 41, and finally shift the terminal rack carrier 44 for the full shifting extent in the direction of shifting of the first cam follower 28 (to the right, Fig. 1). By this arrangement, the terminal carrier 44 has been shifted in the same direction, but for twice the distance, as compared to the shifting imparted by the cam 47 to the cam follower 28.

As pointed out in the foregoing, a device of the type illustrated in Fig. 1 and described in the foregoing is used in connection with the lathe 21 shown in Figs. 7–10 and generally designated there at 56 and respectively 57. The terminal carrier 44 (Fig. 1) corresponds to the terminal carriers 58 (Fig. 8) and 59 (Figs. 8 and 9), respectively, and is, as will be more fully explained further below, the element which shifts the tool in at least one of the directions necessary for turning the work piece.

Returning to the device shown in Fig. 1, the shifting of the terminal carrier 44 may not be made only by the first cam follower 28, but by any other of the cam followers, either alone or in cooperation with one or more of the other cam followers.

Where two or more of the cam followers are actuated by their respective cams simultaneously, the resultant movement of the terminal carrier 44 will be compounded from the movement of the shifting individual cam followers. Where the shifting of the cam followers is in the same direction, the resulting shifting of the terminal carrier 44 will be the sum of the movements of the cam followers, and where the cam followers are shifted in opposite directions, the resulting movement of the terminal carrier 44 will correspond to the subtraction thereof.

The device in accordance with Fig. 1 enables the construction of individual cams for compound movement of the tool that turns the work piece. It also enables, by the simple device of changing one of the cams, to provide for a predetermined deviation of the copied work piece from the master.

In accordance with the invention, the elements of the device shown in Fig. 1 may work singly or in cooperation. Where the work by less than all of the cam followers is desired, the remaining followers may be temporarily immobilized, for instance by stop means such as handle carrying set screws designated 61 for the device 56, and 62 for the device 57 (Fig. 8), one set screw being assigned to each cam follower.

Master

Before describing the entire lathe itself, there will now be explained a master of the type that may be copied on the lathe in accordance with the invention. Such a master, for instance, a particular kind of crank shaft 71, is illustrated in Figs. 2–6. In Figs. 2–2d there are shown profiles of cams I–IX.

The particular crank shaft 71 comprises a first axle 72 (Fig. 2) that has a tapered end portion 73 and a cylindrical portion. Adjacent the axle 72 there is provided a first crank disc 74 that is elliptical in shape (Fig. 5) and has two plane faces (Fig. 2). In the peripheral surface of the disc 74 there is formed a groove 76 that has a semi-circular cross section and has for most of its extension an annular circular shape but also has for a fraction of its extension an arcuate portion 77. Adjacent to the disc 74 there is disposed the crank 78 which, like the disc 74, is offset eccentrically from the axis of the axle 72 for a distance "e". At the other end of the crank 78 there is formed a second crank disc 79 that includes an extension 81 (Figs. 2 and 6) which has in its side faces two differently shaped grooves 82 (Fig. 4) and 83 (Fig. 3). The second axle 84 comprises a cylindrical portion 86 and a clover leaf shaped end portion 87.

Cams

The following cams are provided for machining the crank shaft 71.

The cam I (Figs. 2 and 8) has a shape similar to the shape of the axle 72 and the outer overall contour of the first disc 74; as the axle 72 is of circular cross section throughout, the shaping of the tapered portion 73 and the cylindrical portion of the axle 72 can be carried out with the cam I alone.

The shaping of the outer contour of the disc 74, however, requires four cams, namely the cam I for transverse feed of the tool, the cam IV (Figs. 2c and 8) for the transverse feed to shape the disc 74 elliptically, the cams II (Figs. 2 and 8) and X (Figs. 2e and 8) for the shaping of the groove 76 including the arcuate portion 77 thereof; the cam II operates the transverse feed for the groove 76, while the cam X acts on the longitudinal feed for the portion 77 thereof; it will be observed that the radial feed cam IV is offset eccentrically for the distance of the eccentric "e". The cams I, II, IV and X operate simultaneously compounding the movement of the terminal carrier for adjusting the portion thereof during this operation.

A transverse feed cam IX (Figs. 2b and 8) is provided for the crank 78 and is offset for the distance of the eccentric "e," and is also used during the planning of the disc surfaces facing the crank 78.

In order to shape the outer contour of the disc 79, there are needed the transverse feed cam III (Figs. 2 and 8), and the transverse feed cam VI (Figs. 2d and 8). For the machining of the face having the groove 82, there are needed the longitudinal feed cam VIII (Figs. 2 and 8), the transverse feed cam IX for the eccentricity "e," and these cams VII and IX operate simultaneously; for the machining of the face having the groove 83, there is needed the longitudinal feed cam VIII (Figs. 2 and 8).

The cylindrical portion 86 of the second axle 84 may again be turned with the transverse feed cam III alone, as this cam has a portion appropriate for the cylinder 86.

For the shaping of the clover leaf end portion 87, there will be required the transverse feed cam III and the transverse feed cam V (Figs. 2a and 8).

The cams I–X are simple to make. They can be made of sheet metal or other suitable inexpensive material, and, as best shown in Figs. 2–2e, their measurements may easily be taken off the drawing of the master. It is among the advantages of the invention to provide for inexpensive cams replacing the use of an expensive master, which becomes especially important when it is desired to incorporate a deviation from the master without first making a new master; instead, by a simple change of one cam, or the addition of another cam for cooperation with the other, this deviation may simply be important to the work piece.

In the ensuing description of the lathe, it will be shown how these cams are built in for cooperation with devices of the type shown in Fig. 1.

Lathe

The aforedescribed first carriage 23 is movable in directions C and D axially or longitudinally of the work piece, for instance the crank shaft 71, the disc 74 of which is shown in Fig. 7. The work piece may be suspended, in conventional manner between head and tail stock (not shown), and a gear 88 may be connected concentrically to the head stock for concentric and synchronous movement together with the work piece 71.

A second carriage 89 is slidably mounted and movable on the first carriage 23 in opposite directions A and B perpendicularly of the longitudinal direction and transversely of the work piece 71. A third carriage 91 (Figs. 7 and 9) is movable on the second carriage 89 in the directions C and D parallel of the movement of the first carriage 23 and axially or longitudinally of the work piece 71. A fourth carriage 92 is movable on the third carriage 91 and holds the tool 93 and is operable to move the tool 93 axially or longitudinally (directions C, D) as well as transversely (directions A, B) of the work piece 71. The fourth carriage 92 is provided with a hand operable spindle 94 for the movement lengthwise of the work piece 71, and with a hand operable spindle 96 for the movement of the tool 93 radially of the work piece 71.

A main spindle 97 is provided between said first carriage 23 and the bed 22 and is turned by an electric motor (not shown) for moving the carriage 23 at uniform selectively adjustable speed in directions C and D axially of the work piece 71 and lengthwise of the bed 22.

A spindle 98 is provided between the first carriage 23 and the second carriage 89, for movement of the second carriage 89 in directions A and B transverse of the work piece 71. As best shown in Fig. 8, the spindle 98 is connected to a double electromagnetic clutch 99 of well known conventional design, and the clutch 99 in turn is connected to an electric motor 101. One part of the clutch 99 is driven from the motor 101 over a set of gears 102 and 103 to turn in one direction, while the opposite part of the clutch 99 is driven in the opposite direction from the motor 101 over a set of gears 104, 106 and 107. The clutch 99 comprises a movable element 108 that is connected for rotation with the spindle 98 and is shiftable between the aforementioned parts for alternatively turning the spindle 98 in either opposite direction. The shifting of the element 108 can be carried out by hand for selective transverse feeding, or the clutch otherwise be manually set for transverse feed; furthermore, the element 108 can be shifted electromagnetically, by means of an electric circuit 109 which is interconnected to the clutch 99 and which includes a three position switch 111. Said switch 111 is connected to one arm of a two arm lever 112 which carries at the opposite arm a gear segment 113 that is in mesh with the rack of the terminal rack carrier 58 that extends from the device 56. The control device 56 is fixedly mounted on the carriage 23. The lever 112 is rotatably journalled on the carriage 89 (Figs. 7, 8). The lever 112 can move the switch 111 either to neutral position (shown in Fig. 8) for the de-energization of the spindle 98, to an active position for turning of the spindle 98 by the clutch 99 in one direction for movement of the carriage 89, and forwardly to an opposite active position for turning of the spindle 98 by the clutch 99 in the opposite direction for opposite movement of the carrier 89.

The device 56 has three cam followers 114, 116, and 117 that cooperate with the cams I, II, and III respectively (Fig. 8). The cams I, II, and III are mounted on an extension 118 of the bed 22 (Fig. 7) and each cam is operable to shift one of the cam followers 114, 116, and 117 as the latter are moved past the cams in the direction D when the carriage 23 is moved on the bed 22 by the spindle 97.

Furthermore, on the opposite side the device 56 has four cam followers 119, 121, 122, and 123 that cooperate with the rotary cams IV, IX, VI, and V respectively. The last named rotary cams are driven at uniform speed from the gear 88 and in synchronism therewith, by a transmission 124. Said transmission 124 comprises a train of gears 126, bevel gear 127, a rotatable shaft 128, bevel gears 129, a shaft 131, a pair of pinions 132 that are spaced from each other on the shaft 131, and each pinion 132 is in mesh with a gear, namely with the gear 134 and with the gear 136. The gear 134 is in direct driving connection with the cams V and VI, and the gear 136 with the cams IV and IX (Figs. 7 and 8).

As explained earlier herein, the cam followers of the device 56 will operate the terminal rack carrier 58, imparting to the latter a shifting the extent of which at any given moment is compounded from the momentary shifting position of the individual cam followers by action of the cams acting on the followers.

As explained below, any longitudinal displacement of the carrier 58 relative to the control device 56 results in an equal displacement of the carriage 89 in either the direction A or B relative to the carriage 23. The displacement of the carriage 89 is caused by the action of the lever 112, the switch 109 and the clutch 99, which elements operate like a follow-up system.

As previously stated, the control device 56 is fixedly mounted on the carriage 23, while the carriage 89, carrying the fulcrum of the lever 112, is slidably mounted on the carriage 23. Assuming that the carrier 58 is displaced in the direction B (that is, to the right in Fig. 8). This displacement will turn the lever 112 counterclockwise, the lever 112 thus closing the switch 109 in a sense to energize the clutch 99 to connect the screw 98 mechanically to the gear 103 while the gear 107, rotating in the opposite sense, is idling. The resulting rotation of the screw 98 causes the carriage 89 to move to the right with reference to the carriage 23, which movement is also imparted to the fulcrum of the lever 112, turning the latter clockwise and thus returning it to its neutral position in which the switch 109 opens. At this instant, the displacement of the carriage 89 has become equal to the displacement of the carrier 58 that initiated the process. With all signs reversed, the same will occur upon a displacement of the carrier 58 in the direction A, as the switch 109 will then energize the clutch 99 to connect mechanically the gear 107 to the screw 98, thus starting the carriage 89 in the opposite direction. In normal operation, of course, the follow-up of the carriage 89 will become practically continuous, as does any follow-up system of the kind just described, as is well known to those familiar with control and regulator techniques.

With the carriage 89 being operated from carrier 58 in the way explained, the movement of the carrier 58 is transmitted, through the gear segment 113, to the arm 112 and to the switch 111, resulting in shifting of the clutch 99 for alternately turning the spindle 98 for reciprocable movement of the second carriage 89 as well as for the halting of the carriage 89. By this movement of the carriage 89, the tool 93 is moved back and forth transversely of the work piece 71 as impelled through the action of the cams on the cam followers compounded in the device 56, and the carriage 89 after completion of movement in either direction will come to a halt when the switch 111 positions the element 108 in neutral position in the clutch 99. With the aid of the cams I, II, III, IV, V, VI and XI the carriage 89 may be so moved that the tool 93 will receive the desired outer contour.

For employing the cams VII, VIII and X, however, there is provided the device 57 which is located on, and moves with, the said carriage 89 and acts on, and moves, the third carriage 91.

On the first carriage 23 there are secured the cams VII and VIII (Fig. 8), and cam followers 137 and 138, respectively, of the device 57 cooperate with said cams. Furthermore, in the carriage 89 there is journalled the rotary cam X which is driven from the shaft 128 over a gear train 139. A cam follower 141 cooperates with the cam X.

The terminal rack carrier 59 of the device 57 (Fig. 8) is in mesh with a gear segment 142 (Fig. 9) that forms part of a bell crank lever 143. The crank lever 143 has its fulcrum on the carriage 91 (Fig. 9). The other arm 144 of said bell crank lever 143 carries an electric three-position switch 146 of a circuit 147 which includes an electromagnetic clutch 148, similar to the clutch 99. The clutch 148 turns, depending on the position of the switch 146, in either of opposite directions a spindle 149 that is in treading engagement with the carriage 91. The clutch 148 is operated by an electric motor 151 (Fig. 10), in a manner similar to that of the clutch 99 and its motor 101 previously described. Likewise, the control of the carriage 91 is similar to that of the previously described control of the carriage 89.

By this arrangement, the cams VII, VIII, and X can positively guide the carriage 91, for movement of the tool 93 axially of the work piece 71.

Operation

In describing the operation of the lathe 21, it is assumed that the operator will proceed to turn the work piece 71 from the right hand side to the left hand side of Fig. 2, starting with the turning of the tapered axle portion 73 and terminating with the clover leaf portion 87 of the second axle 84.

First, the operator will tighten all the set screws 61 of the device 56 with the exception of that for the cam follower 114 which will be released, permitting the follower 114 alone to be shifted. Thereafter, the operator will start rotation of the spindle 97 to move the first carriage 23 along the bed 22 in direction D (Fig. 8). During this movement, the cam follower 114 will follow first the slanting surface and then the adjacent straight surface of the cam I. As soon as the tool 93 has reached the first side surface of the crank disc 74, the traverse feed will be disconnected, by means of the switch 111 acting on the circuit 109. Therefore, the operation will disconnect the spindle 97, and set the clutch 99 by hand for transverse feed, as explained earlier herein. The tool 93 will thereupon cause planing of the surface of the disc 74. It will be necessary, however, that prior to this turning of the right face the gear segment 113 is disconnected from the carrier 58, in order to render possible the transverse movement of the carriage 89 which during this machining of the surface is not under control of any cam. Alternatively, if the operator prefers not to make this disconnection, he can plane the surface of the disc 74 by hand, by the operation of the spindle 96.

Thereafter, the set screw 61 for the cam follower 119 (cam IV) is released, and the spindle 97 again connected for resumption of the longitudinal movement of the carriage 23. At the same time the set screw 61 for the cam follower 116 (cam II) and the set screw 62 for the cam follower 141 (cam X) are released. During the ensuing machine operation, the tool 93 will complete the machining of the outer surface of the disc 74 including the groove 75 and its arcuate portion 77, by means of impulses imparted from the cams I, II, IV, and X.

Thereafter, the left face of the disc 74 will be planed; during this phase the eccentricity of the crank shaft 71 must be taken into account. The operator will therefore tighten the set screw 61 for the cam follower 119 (cam IV), for the follower 114 (cam I) and the follower 116 (cam II) and the set screw 62 for the cam follower 141 (cam X), and will release the set screw 61 for the cam follower 121 (cam IX). Thereby, the cam IX and its follower 121 will be active, while all the other followers will be immobilized. The cam IX provides for the eccentricity "e" so that the tool 93 can be moved inwardly only up to the surface of the crank 78 but will not undercut the same. The cams I and II can also be left active, but are not needed for this operation, and hence have been described as de-activated. The actual planing is done by hand, moving the tool 93 with the aid of the spindle 96. Then follows the turning of the crank 78. For this, the operator will maintain the action of the cam follower 121 cooperating with the cam IX, and will actuate the spindle 97 for lengthwise movement of the first carrier 23.

Then follows the planing of the right face of the disc 79. For this operation the cam follower 121 (cam IX, for the eccentricity "e") will be retained in active operation, and in addition to set screw 62 of the cam follower 137 (cam VII) will be released for the machining of the groove 82. For this operation, the longitudinal feed will be de-activated and the transverse feed activated by hand.

Thereafter, there follows the machining of the outer surface of the disc 79. For this operation, the set screw 61 of the cam follower 121 (cam IX) will be tightened to immobilize the same and, instead, the set screw 61 for the cam follower 122 (cam VI), as well as the set screw 61 of the follower 117 (cam III) will be released. There will thus be compounding of the impulses imparted by the cams III (transverse), VI (transverse) and IX (transverse, eccentric "e"). For this operation, the transverse feed is de-activated and the length feed again activated manually by the operator.

For the ensuing machining of the left face of the disc 79, the set screws 61 for the cam follower 122 (cam VI) and for the followers 121 (cam IX) and 117 (cam III) will be tightened, and, conversely, the set screw 62 for the cam follower 138 (cam VIII—for the groove 83) be released. For this operation there will be active the cam VIII. The length feed will be de-activated and the transverse feed activated by the operator.

Thereafter, the transverse feed will be deactivated and the length feed activated, by hand, for the turning of the second axle 84. The set screw 62 for the follower 138 (cam VIII) will be tightened, and the set screw 61 for the follower 117 (cam III) be released. The cylindrical portion 86 of the axle 84 will be machined as guided by the cooperation between the cam follower 117 and the cam III. For the machining of the clover leaf shaped portion 87, however, the operator will furthermore release the set screw 61 of the cam follower 123 for cooperation with the cam V (Figs. 2a and 8).

Modification

The lengthwise feeding of the first carriage 23 may, instead, be carried out by dividing the rack of the carrier 58 and connecting the two parts of the divided carrier 58 by spindle which, for instance, may be manually operated, and which has two threads of opposite pitch (not shown). By turning the spindle, the length of the carrier 58 may be varied and thereby the feed of the carrier 23 be controlled.

Tool

In the foregoing description the succeeding steps of lengthwise and transverse machining have been described without regard to the shape of the tool. As is well known to those skilled in this art, it is usually necessary to change the tool between the step of radial and axial machining of the work piece as well as for the machining of oppositely facing radial surfaces. In practice, either the tool 93 may be changed between such machining steps, or a universal type of tool bit be used having a plurality of cutting edges that may be selectively shifted in and out of operating position. As a further possibility, the operator may first machine all the circular surfaces of the work piece, as well as all the faces of the discs facing in the same direction and, thereafter, with a different tool bit, machine the oppositely disposed faces of the discs.

Automatization

In the foregoing it has been explained that the set screws 61 and 62 of the individual cam followers are tightened and released manually. It is of course possible to arrange, instead, for mechanical or electrical or hydraulic automatic operation of these set screws, timed for activation at the proper momentary positions of the tool 93 on the work piece 71, and in this manner a large degree of automatization of the entire machining process will be accomplished.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what I claim as new and desire to be secured by Letters Patent, is as follows:

1. In a lathe, for use in machining a work-piece of predetermined shape and dimensions, having a tool movable in two directions at an angle to each other and being controlled in said directions, in combination, a separate mechanism for moving said tool in each of said directions, each mechanism comprising a series of cam and retractable cam follower means, each cam being formed of a flat piece of material and profiled, some of said cams being rotatable synchronously with the work-piece, and other cams being fixed and disposed in the path of the respective followers movable with said tool, and means actuatable for selectively immobilizing cam followers in the retracted position for restraining movement thereof, the movements of all the moving cam followers of a mechanism causing a resultant movement imparted to the tools in one of said directions, a gear journalled on each cam follower, and a plurality of spaced racks, each cam follower being disposed between two racks and being in mesh therewith, at least some of said racks being movable longitudinally of said cam followers, whereby the cam follower movements will be compounded.

2. In a lathe, as claimed in claim 1, one of said racks adjacent the first of said cam followers being fixed and the remaining racks being movable.

References Cited in the file of this patent

UNITED STATES PATENTS

| | | |
|---|---|---|
| 1,064,988 | Osgood | June 17, 1913 |
| 1,893,916 | Waldrich | Jan. 10, 1933 |
| 1,916,581 | O'Brien | July 4, 1933 |
| 1,969,647 | Howard | Aug. 7, 1934 |
| 2,225,409 | Bromley | Dec. 17, 1940 |
| 2,435,280 | Jaeger | Feb. 3, 1948 |
| 2,660,930 | De Vlieg | Dec. 1, 1953 |

FOREIGN PATENTS

| | | |
|---|---|---|
| 175,759 | Austria | Aug. 10, 1953 |
| 507,836 | Belgium | Dec. 31, 1951 |
| 848,135 | Germany | Sept. 1, 1952 |